United States Patent
Zelt, III

[19]

[11] Patent Number: 6,082,238
[45] Date of Patent: Jul. 4, 2000

[54] SPACERS IN AND FOR CUTTING DEVICES

[75] Inventor: Albert R. Zelt, III, Bethel Park, Pa.

[73] Assignee: Asko, Inc., Homestead, Pa.

[21] Appl. No.: 09/226,416

[22] Filed: Jan. 6, 1999

Related U.S. Application Data

[60] Provisional application No. 60/076,217, Feb. 27, 1998, and provisional application No. 60/083,990, May 1, 1998.

[51] Int. Cl.[7] .................................................. B26D 7/26
[52] U.S. Cl. .......................................... 83/664; 83/425.3
[58] Field of Search .................................. 83/664, 425.3, 83/665, 698.41, 678; 492/56, 36, 33, 39, 49, 53, 54; 411/900, 901

[56] References Cited

U.S. PATENT DOCUMENTS

| | | | |
|---|---|---|---|
| 737,194 | 8/1903 | Armstrong | 83/664 |
| 2,804,134 | 8/1957 | Berry et al. | 83/501 |
| 3,279,296 | 10/1966 | Jung et al. | 83/664 |
| 3,568,738 | 3/1971 | Thrasher | 143/55 |
| 3,645,304 | 2/1972 | Thrasher | 143/160 |
| 4,195,542 | 4/1980 | Zimmer | 83/664 |
| 4,429,837 | 2/1984 | Knecht | 241/292.1 |
| 4,680,851 | 7/1987 | Legg | 83/664 X |
| 4,732,337 | 3/1988 | Knecht | 241/292.1 |
| 4,805,506 | 2/1989 | Gosnell | 83/500 |
| 5,113,735 | 5/1992 | Paquin | 83/508.3 |
| 5,316,061 | 5/1994 | Lee | 144/218 |
| 5,392,758 | 2/1995 | Rognon | 125/13.01 |
| 5,537,728 | 7/1996 | Van Mourik | 29/467 |

FOREIGN PATENT DOCUMENTS

| | | |
|---|---|---|
| 0 189 952 | 8/1986 | European Pat. Off. ........ B23D 19/06 |
| 0 251 628 | 1/1988 | European Pat. Off. ........ B23D 19/06 |
| 0 313 544 | 4/1989 | European Pat. Off. ........ B23D 19/06 |
| 0 523 369 | 1/1993 | European Pat. Off. ........ B23D 35/00 |
| 0 783 942 | 7/1997 | European Pat. Off. .......... B26D 7/26 |
| 1 406 833 | 6/1965 | France . |
| 2 167 554 | 8/1973 | France . |

OTHER PUBLICATIONS

Alaska, "How To Select Your Ulu", p. 6, Sep. 1997.
European Search Report for corresponding European Application No. EP 99 30 1484 dated Jun. 14, 1999.

*Primary Examiner*—Kenneth E. Peterson
*Assistant Examiner*—Dominic Troiano
*Attorney, Agent, or Firm*—Reed Smith Shaw & McClay LLP

[57] ABSTRACT

A spacer element having a first material and at least one second material. The at least one second material has a specific gravity less than that of the first material, and the first material is integrated with the at least one second material. Also contemplated is a rotary knife arrangement having such a spacer element.

4 Claims, 4 Drawing Sheets

SPACERS IN AND FOR CUTTING DEVICES

This application is a continuation of provisional application Ser. No. 60/076,217, filed Feb. 27, 1998, and Ser. No. 60/083,990, filed May 1, 1998.

FIELD OF THE INVENTION

The present invention generally relates to components used in conjunction with cutting devices, such as rotary slitter knives used in the metallurgical industries for slitting, lengthwise, metal that has been produced in strip form.

BACKGROUND OF THE INVENTION

General examples of rotary slitter knives are to be found in U.S. Pat. No. 5,574,890 (Rackoff et al.) and U.S. Pat. No. 4,336,083 (Dempsey). For the purposes of providing background information, these patents are hereby incorporated by reference as if set forth in their entirety herein.

Typically, a pair of rotary knives, mounted on respective mounting rods (or "arbors"), will be located on opposite sides of a metal sheet as it is being passed between the knives. The two rotary knives, which are not directly opposite one another, will then converge on the metal sheet and, as long as they are in contact with the metal sheet, will create a shear fracture that serves to actually cut the metal sheet.

Several such knives will usually be located on each rod, separated by predetermined distances over the longitudinal extent of each rod, so as to enable the simultaneous cutting of the metal sheet into several narrower strips.

It is conventional to utilize metal spacers in between the rotary knives on each arbor, to establish and maintain predetermined distances between neighboring rotary knives on each arbor. However, several disadvantages have been noted in conjunction with conventional metal spacers.

Generally, metal spacers (usually steel spacers) have been found to be inordinately heavy, leading to problems such as wear on the arbors (from excessive loading). Furthermore, conventional metal spacers can be prone to damage and wear on their extreme edges or surfaces.

SUMMARY OF THE INVENTION

In accordance with at least one presently preferred embodiment of the present invention, a spacer for a rotary cutting apparatus is formed from a first material (such as a metal, and preferably steel), and at least one second material having a specific gravity less than that of the first material. The formation could, in accordance with at least one embodiment of the present invention, be considered to be a composite formation. The "at least one second material" can be chosen from any of a very wide range of materials having a specific gravity that is less than that of the first material. If the first material is steel, then suitable materials for use as the "at least one second material" could be represented by, for example, plastic, rubber or other flexible material, polymers, polyurethane, ceramic, or even a metal such as titanium. Even wooden materials are conceivable for use within the scope of the present invention as the "at least one second material". A primary advantage of spacers so formed is that overall weight is reduced.

In accordance with at least one presently preferred embodiment of the present invention, a composite is formed from essentially two layers: an outer layer comprising the first material and an inner layer comprising the "at least one second material". In one embodiment, the two layers could essentially be strictly annular, with the inner layer substantially completely nested within the outer layer. However, variant embodiments along the lines of this general concept are also contemplated within the scope of the present invention.

In accordance with at least one presently preferred embodiment of the present invention, a composite can be formed from two or more layers in which an outermost layer comprises the "at least one second material". In connection with such an arrangement, it will be appreciated that erosion of the metal surfaces can be protected (assuming that the "first material" is metal). Particularly, since spacers are conventionally used for fixing the separation distance between neighboring rotary knives, damage and wear on the extreme edges or surfaces of conventional metal surfaces can result in inaccurate "set up" on the cutting machine in question. In other words, erosion of the metal surfaces will possibly cause the adjacent rotary knife or knives to be offset from their originally intended position, thus leading to inaccuracies in any cutting task to be performed. Since accuracy is often of paramount importance in cutting, offsets on the order of as little as hundredths of an inch can cause serious problems in terms of inadequately executed cutting jobs, which in turn can lead to wasteful rejections of cut material.

It will be appreciated that the present invention broadly contemplates several arrangements involving the use of a first material and at least one second material in a spacer, and that specific embodiments within the broadest definition of the invention will each present their own attendant advantages. It should be stressed that a primary common advantage among several embodiments is the reduction in weight afforded by the use of at least one second material having a specific gravity less than that of the first material.

Otherwise, one will appreciate that different embodiments will afford different characteristics and advantages, and the type of spacer employed can be chosen on the basis of the characteristics and advantages sought.

BRIEF DESCRIPTION OF THE DRAWINGS

The present invention and its presently preferred embodiments will be better understood by way of reference to the detailed disclosure herebelow and to the accompanying drawings, wherein.

DESCRIPTION OF THE PREFERRED EMBODIMENTS

Figure 1:
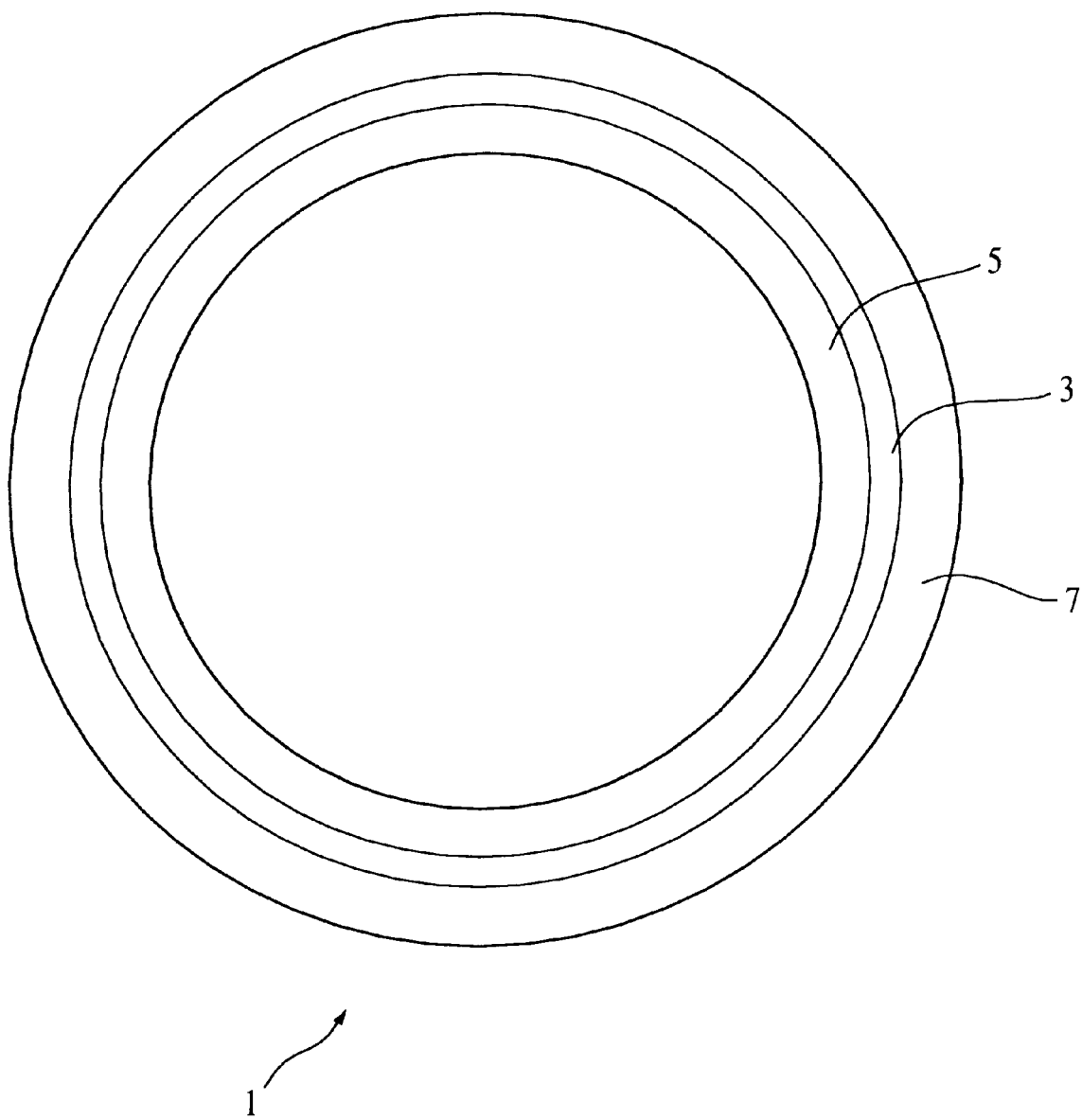
FIG. 1 is an elevational view illustrating a general embodiment of a spacer element.

FIG. 1 is an elevational view illustrating a general embodiment in accordance with at least one presently preferred embodiment of the present invention. Illustrated is a spacer 1 formed from a layer of a first material 3 sandwiched between two layers (5, 7) of a different material. Within the scope of the present invention, the two layers (5, 7) may each be formed from different materials; however, in a preferred embodiment of the present invention, these layers are formed from the same material.

Figure 2A:
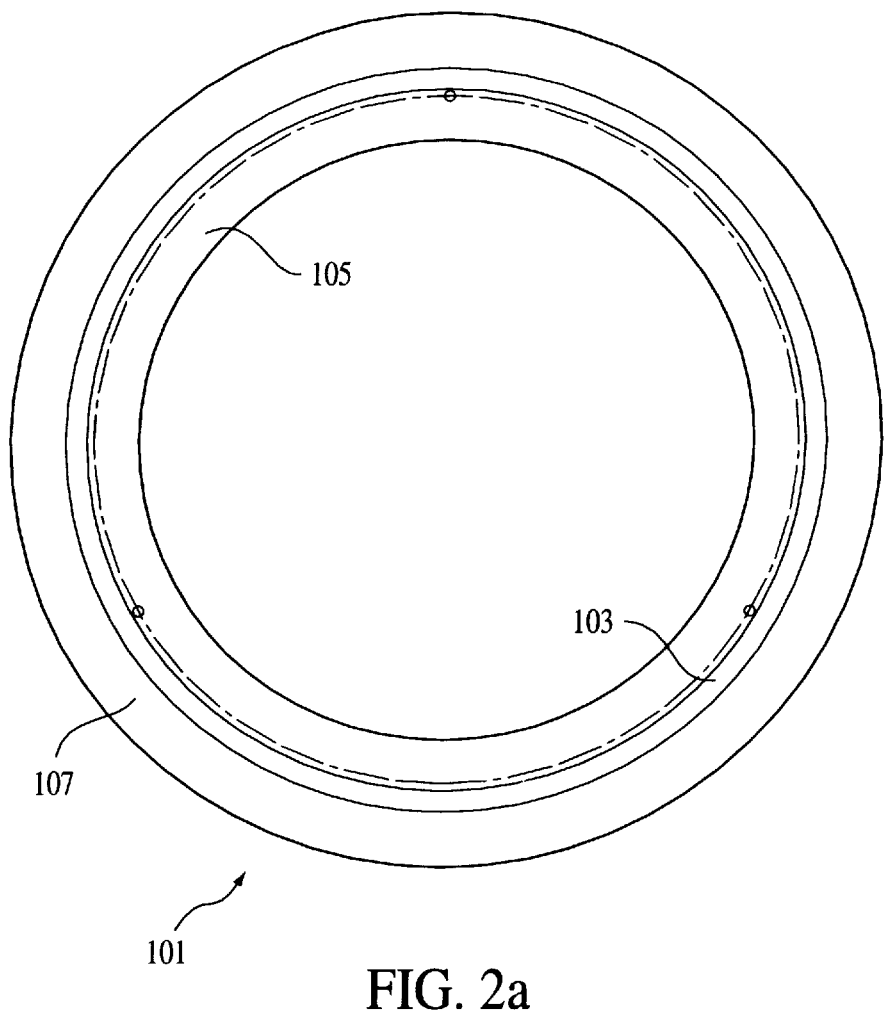
FIGS. 2a and 2b are side and front elevational views, respectively, illustrating a specific embodiment of a spacer element.
Figure 2B:

FIGS. 2a and 2b illustrate a more specific embodiment of a spacer (indicated at 101). FIG. 2a is an elevational view while FIG. 2b is a side view. The layer of "first material", in this case steel, is indicated at 103, while the two "sandwiching" layers, in this case each formed from a polyurethane having a durometer measurement of about 90, are indicated at 105 and 107. Some other dimensions and materials that are conceivable are as follows: three holes, 0.125 in. in diameter at 0.188 in. deep, may be equally spaced about the circumference of the spacer 101 (FIG. 2a) along an imaginary circle of 7.844 in. diameter; the inner diameter of the spacer 101 may be about 7 in.; along this same inner diameter, at one end of the spacer 101, the edge may be beveled at 45 degrees, with a transverse surface dimension of 0.031 in.; inner polyurethane layer 105 may have an outer diameter of about 8 in. (thus also corresponding to an inner diameter of steel layer 103); steel layer 103 may have an outer diameter of about 8.75 in. (thus also corresponding to an inner diameter of outer polyurethane layer 107); the spacer 101 at large may have an outer diameter of about 9 in.; spacer 101 may have a thickness of about 2 in.; and the polyurethane material may be black in color.

In any conceivable embodiment of the present invention, the layer of "first material" (3, 103) may be adhered to the layers of "at least one second material" (5, 105; 7, 107) by essentially any suitable means known to those of ordinary skill in the art.

Although, in accordance with the embodiments illustrated in FIGS. 1–2b, it is possible and desirable to form the spacer from discrete annular layers of material that each extend essentially along essentially the entire longitudinal extent of the spacer, it is conceivable, within the scope of the present invention, to provide an arrangement in which the layer of "first material" is embedded in at least one layer comprising the at least one second material. In this respect, it is conceivable to embody the "first material" as one or more rings of material that are disposed substantially completely within the at least one second material and that are not at all exposed at either of the opposing faces of the spacer. In any event, the present invention broadly contemplates a wide range of embodiments in which a first material is integrated with at least one second material, whereby the "integration" could be carried out by embedding the first material in the at least one second material, as just discussed, or by simply sandwiching a layer of the first material between two layers comprising the at least one second material.

Figure 3:
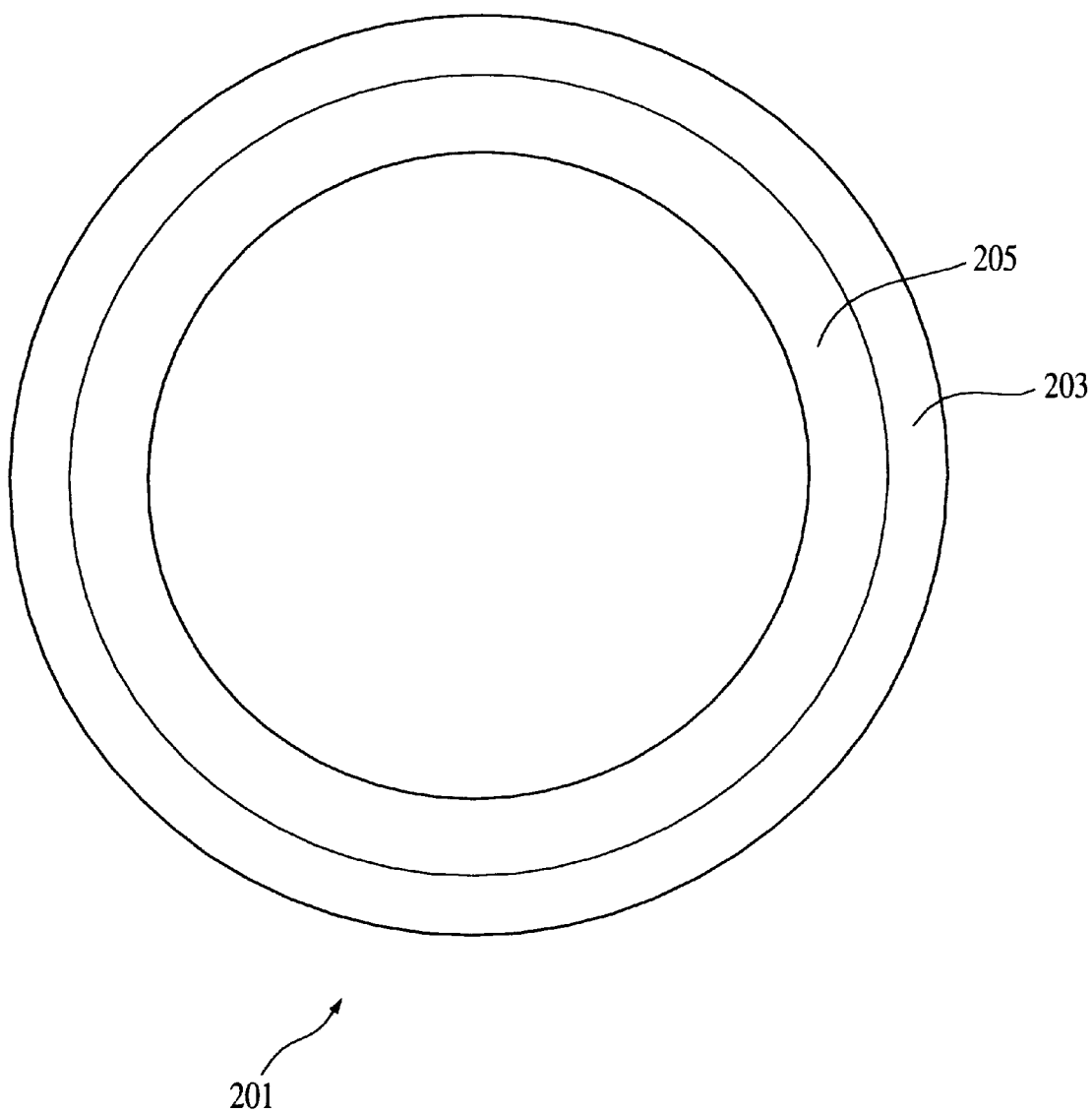
FIG. 3 is an elevational view illustrating another general embodiment of a spacer element.

FIG. 3 illustrates another general embodiment in accordance with at least one presently preferred embodiment of the present invention. Particularly, illustrated in FIG. 3 is a spacer 201 formed from a layer of a first material, as an outer or "first" layer 203, disposed outwardly of an inner or "second" layer 205 comprising a different material. A significant difference with respect to the embodiment shown in FIG. 1 is that there is no further outer layer (e.g., the layer 7 shown in FIG. 1) comprising a material different from that forming the layer 203.

Preferably, the material of the second layer 205 will have a specific gravity less than that of the material of the first layer 203. For example, in a presently preferred embodiment of the present invention, the first layer 203 may be formed from steel while the second layer 205 may be formed from polyurethane. However, it is possible to use a wide range of variant materials as the "first material" and the "at least one second material" as discussed previously.

It has been found that by forming the first layer 203 from a material having a higher specific gravity than that of the inner, second layer 205, a tremendous portion of the support strength (i.e., support, in a direction parallel to the longitudinal axis of the arbor, provided for the rotary knives) is still retained as compared to a similarly sized spacer formed entirely from the first material having the higher specific gravity. Particularly, with the first material, having the higher specific gravity, being positioned radially outwardly of the at least one second material, having the lower specific gravity, the first layer 203 provides a fulcrum against the neighboring rotary knives that is greater than that provided by the second layer 205 and is thus able to provide more adequate support for the rotary knives than if the "at least one second material" were being used as the first layer 203 and if the first material were being used as the second layer 205.

Although, in accordance with the embodiment illustrated in FIG. 3, it is possible and desirable to form the spacer 201 from discrete annular layers of material that each extend essentially along essentially the entire longitudinal extent of the spacer, it is conceivable, within the scope of the present invention, to provide alternative arrangements having substantially the same effect. In this respect, it is conceivable to embody the "at least one second material" as one or more smaller rings, or other smaller discrete pieces, of material that are substantially encased by the first material. This would still represent a significant departure over known arrangements in which the entire spacer is formed from a "first material" such as steel.

Figure 4:
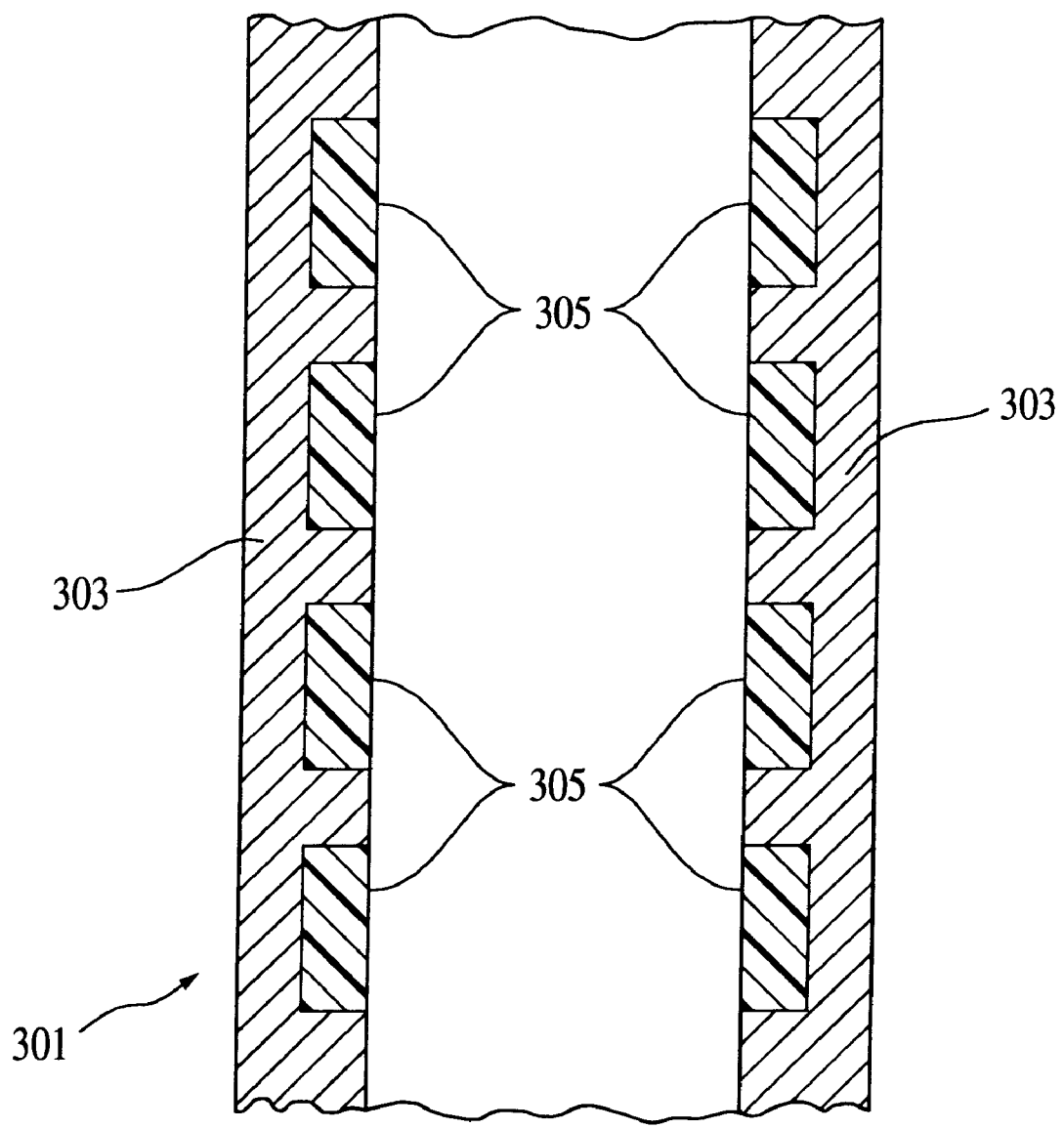
FIG. 4 is a longitudinal cross-sectional view of another specific embodiment of a spacer element.

An example of the above-described embodiment is shown in FIG. 4, which is a longitudinal crosssectional view of a spacer 301. Particularly, the spacer 301 includes a portion comprising the first material 303 (shown as a metal) and several portions comprising the at least one second material 305 (shown as a polymer or plastic). In this case, the portions comprising the at least one second material 305 are several discrete rings of material lying along the inner diameter of the spacer 301, whereby several portions of the first material 303 extend into the spaces between the rings of material and thus also extend to the inner diameter of the spacer 301.

Other variants along the same general lines are of course conceivable; for example, instead of discrete rings of material comprising the at least one second material 305, it is conceivable for there to exist several discrete arcuate portions of the at least one second material 305 that lie along the inner diameter of the spacer 301 but that do not actually describe an entire circle about the inner diameter of the spacer 301. In another possible variant, there could be at least one discrete portion comprising the least one second material that lies along the inner diameter of the spacer 301 and that describes at least one helix or at least one partial helix.

In any of the embodiments described, alluded to, contemplated or covered herein, it is to be understood that the layer or portion of the spacer comprising the first material will preferably be so configured and dimensioned as to provide adequate support for the neighboring rotary knives. Thus, for example, if the embodiment shown in FIG. 3 is being employed and nested annular layers are being used, one of ordinary skill in the art will appreciate that there exist thickness dimensions of the first layer 203 that would be too small to provide adequate support for the neighboring rotary knives, depending on the materials being used.

Although the application of rotary knives for cutting metal strip has been discussed herein, it will be appreciated that the present invention, in accordance with at least one embodiment, may be utilized in a wide variety of other possible applications. Other possible applications include, but are not limited to, for example: chippers and shredders as used in industries that handle plastic or wood, tire shredders and meat cutters.

In recapitulation, it will be appreciated that at least the following concepts are broadly contemplated herein:

(1) A spacer element having a first material and at least one second material, the at least one second material having a specific gravity less than that of the first material, and the first material being integrated with the at least one second material.

(2) A refinement of the concept stated in point (1), wherein the first material is sandwiched between two layers comprising the at least one second material.

(3) A refinement of the either of the concepts stated in point (1) or point (2), wherein the first material consists essentially of steel.

(4) A rotary knife arrangement having a spacer such as that described in point (1).

(5) A refinement of the concept stated in point (1), wherein the first material is generally disposed radially outwardly of the at least one second material.

(6) A refinement of the concept stated in point (1), wherein the spacer element comprises a first annular layer and a second annular layer, the first layer being disposed radially outwardly with respect to the second layer, the first layer comprising the first material and the second layer comprising the at least one second material.

(7) A refinement of the concept stated in point (6), wherein the spacer element consists essentially of the first and second annular layers.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. The scope of the invention is defined by the following claims rather than the foregoing description. All changes which come within the meaning and range of equivalency of the claims are to be embraced within their scope.

What is claimed is:

1. A spacer element for use in a rotary knife arrangement, comprising:

a first material; and two layers comprising at least one second material;

said at least one second material having a specific gravity less than that of said first material;

said first material being integrated with said at least one second material;

wherein said first material is radially sandwiched between said two layers wherein said two layers contact said first material only on radially inner and radially outer surfaces of the first material.

2. The spacer element according to claim 1, wherein said first material consists essentially of steel.

3. A rotary knife arrangement comprising:

a spacer element;

said spacer element comprising a first material and two layers comprising at least one second material;

said at least one second material having a specific gravity less than that of said first material;

said first material being integrated with said at least one second material;

wherein said first material is radially sandwiched between said two layers wherein said two layers contact said first material only on radially inner and radially outer surfaces of the first material.

4. The rotary knife according to claim 3, wherein said first material consists essentially of steel.

* * * * *